Sept. 27, 1938.  B. GILOWITZ  2,131,658
COOKING UTENSIL
Filed May 12, 1937
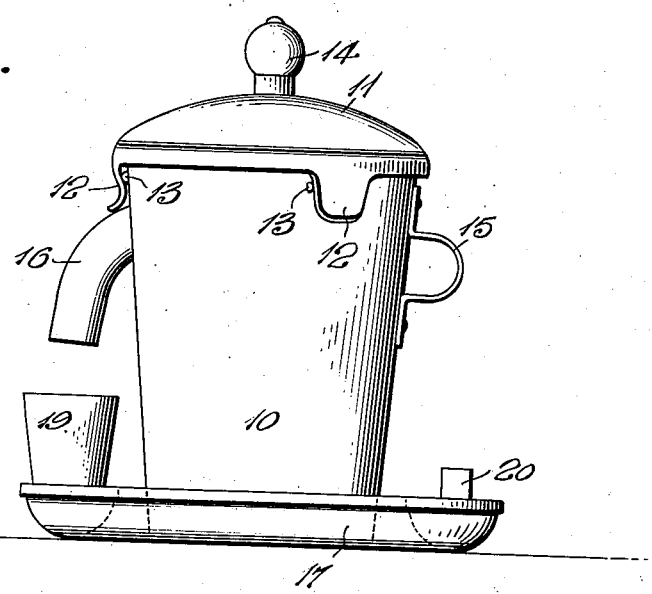
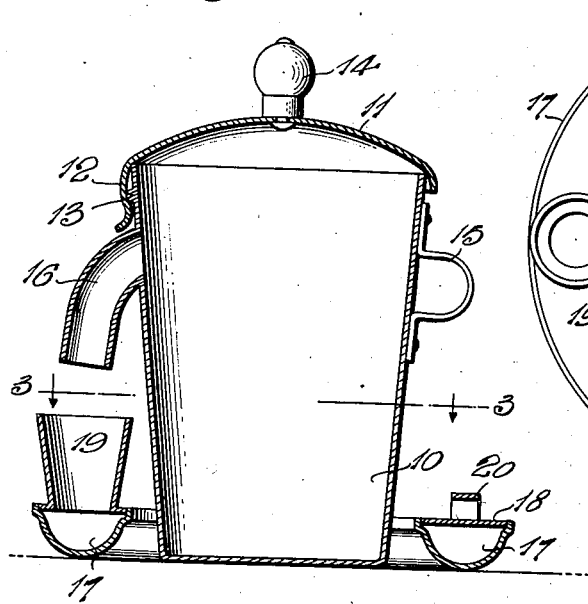
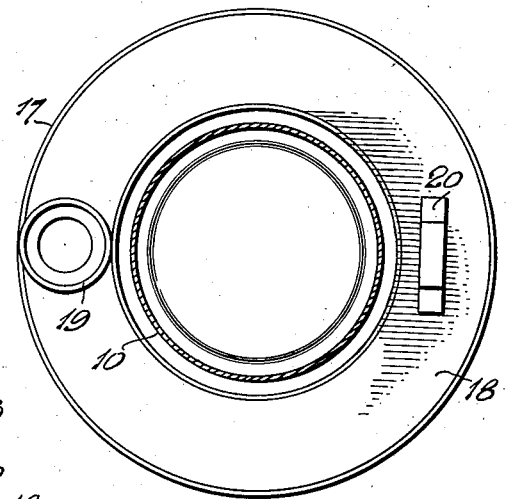
Inventor
B. Gilowitz Patented Sept. 27, 1938

2,131,658

UNITED STATES PATENT OFFICE 2,131,658

COOKING UTENSIL

Benjamin Gilowitz, New York, N. Y., assignor of one-fourth to Charles M. Wolf and one-eighth to Albert Friedberg, both of New York, N. Y.

Application May 12, 1937, Serial No. 142,299

2 Claims. (Cl. 53—1)

The invention aims primarily to provide novel means for conducting any liquid boiling over from a cooking utensil, into a separate receptacle instead of allowing it to discharge upon the cook-stove.

In carrying out the above end, a further object is to provide a unique receptacle of annular form to surround the lower end of a utensil to receive any liquid boiling over therefrom, the utensil being preferably provided with a downwardly curved boil-over spout and the annular receptacle being provided with an upstanding funnel-like inlet disposed under said boil-over spout to receive any liquid discharged therefrom.

With the foregoing in view, the invention resides in the novel subject matter hereinafter described and claimed, description being accomplished by reference to the accompanying drawing.

Fig. 1 is a side elevation showing the form of construction in which an annular receptacle surrounds the lower end of a utensil to receive liquid boiling over from the latter.

Fig. 2 is a vertical sectional view through the construction shown in Fig. 1.

Fig. 3 is a horizontal sectional view on line 3—3 of Fig. 2.

In the form of construction herein disclosed, 10 denotes a cooking utensil having a removable cover 11 which may well be held on the utensil by providing it with spring fingers 12 to snap over ribs 13. 14 merely denotes a knob for removing and applying the cover 11, and 15 has reference to a suitable handle on the utensil 10. This utensil is provided with a downwardly curved boil-over spout 16 through which any liquid which would otherwise overflow from the upper end of the utensil, discharges. The liquid discharging from this spout 16 is received in an annular receptacle 17 which surrounds the lower end of the utensil 10, said receptacle 17 being preferably of such internal diameter that it may also surround utensils of greater diameters than said utensil 10. However, by always having the receptacle 17 sufficiently spaced from the utensil, there is little danger of said receptacle becoming so hot that its own contents will be liable to boil over.

The receptacle 17 is of channel-shape in transverse section, and its top is closed by a removable cover ring 18 which may either fit within the rim of the receptacle as shown, or may fit over said rim. This cover ring 18 is provided with an upstanding funnel-like inlet 19 for disposition directly under the boil-over spout 16 to receive any liquid discharging from said spout, preventing such liquid from reaching the stove and causing the well-known difficulties.

The cover ring 18 is provided with an appropriate handle 20 by means of which it may be readily removed and reapplied. Any of the boiled-over liquid received in the receptacle 17 is of course saved and may be returned to the utensil 10, and the provision of the removable cover-ring 17 for said receptacle allows easy access to its interior for thorough cleaning.

From the foregoing taken in connection with the accompanying drawing, it will be seen that I have made novel provision for carrying out the objects of the invention. While certain details of construction have been illustrated, it is to be understood that the present disclosure is illustrative rather than limiting and that numerous variations may be made within the scope of the invention as claimed.

I claim:

1. A cooking utensil having a downwardly curved boil-over spout, and an annular receptacle surrounding the lower end of said utensil and having a removable cover, said cover being provided with an upstanding funnel-like liquid inlet under said boil-over spout.

2. A receptacle to receive liquid discharged from a boil-over spout of a cooking utensil, said receptacle being of annular form to surround the lower end of the utensil and being provided with a removable cover, said cover having a liquid inlet of upstanding funnel-like form.

BENJAMIN GILOWITZ.